US012759438B2

(12) United States Patent
Vetere, II

(10) Patent No.: US 12,759,438 B2
(45) Date of Patent: Oct. 13, 2026

(54) SWIVEL MECHANISM WITH DUAL FUNCTION BEARING PLATE

(71) Applicant: Magna Seating Inc., Aurora (CA)

(72) Inventor: Louis Vetere, II, Commerce Township, MI (US)

(73) Assignee: MAGNA SEATING INC., Aurora (CA)

( * ) Notice: Subject to any disclaimer, the term of this patent is extended or adjusted under 35 U.S.C. 154(b) by 136 days.

(21) Appl. No.: 18/867,770

(22) PCT Filed: May 22, 2023

(86) PCT No.: PCT/US2023/023097

§ 371 (c)(1),
(2) Date: Nov. 20, 2024

(87) PCT Pub. No.: WO2023/225397

PCT Pub. Date: Nov. 23, 2023

(65) Prior Publication Data

US 2025/0346159 A1 Nov. 13, 2025

Related U.S. Application Data

(60) Provisional application No. 63/344,215, filed on May 20, 2022.

(51) Int. Cl.

| | |
|---|---|
| ***B60N 2/14*** | (2006.01) |
| ***B60N 2/02*** | (2006.01) |
| ***B60N 2/68*** | (2006.01) |

(52) U.S. Cl.
CPC .................................... *B60N 2/14* (2013.01)

(58) Field of Classification Search
CPC ...... B60N 2/14; B60N 2/146; B60N 2/02246; B60N 2/143; B60N 2/02253; A47C 3/18
(Continued)

(56) References Cited

U.S. PATENT DOCUMENTS 3,572,817 A 3/1971 Colautti et al.
4,792,188 A 12/1988 Kawashima
(Continued)

FOREIGN PATENT DOCUMENTS

CN 110626231 A 12/2019
CN 216331577 U 4/2022
(Continued)

*Primary Examiner* — Shin H Kim
(74) *Attorney, Agent, or Firm* — Miller Canfield

(57) ABSTRACT

A swivel mechanism (20) for a seat assembly for use in an automotive vehicle has a base plate (38), a swivel plate (92) pivotally coupled to the base plate and having an inner flange (96), an outer ring (106), and an outer flange (108). The swivel mechanism also includes a retaining ring (54) having a ring portion (60) and fixedly coupled to the base plate with the inner flange (96) spaced axially between the ring portion (60) and the base plate (38). The swivel mechanism also includes a bearing plate (72) comprising an upper channel (78) extending in the circumferential direction and a J-shaped channel (80). The J-shaped channel has an inner side (82) projecting axially upward from the upper channel (78), an outer side (84) projecting axially downward and spaced radially outward from the inner side (82), and a radial portion (86) extending radially between the inner side and the outer side with the outer side (84) fixedly coupled to the base plate.

19 Claims, 5 Drawing Sheets

(58) Field of Classification Search
USPC ............. 297/344.12, 344.13, 344.21–344.26
See application file for complete search history.

(56) References Cited

U.S. PATENT DOCUMENTS

| | | | | |
|---|---|---|---|---|
| 5,000,505 | A | 3/1991 | Kawashita et al. | |
| 5,810,441 | A | 9/1998 | Ezuka et al. | |
| 6,447,065 | B1 | 9/2002 | Ropp | |
| 6,575,420 | B2 | 6/2003 | Yoshida et al. | |
| 7,108,325 | B2 * | 9/2006 | Williamson | B60N 2/08 297/344.22 |
| 7,434,863 | B2 | 10/2008 | Hamazaki et al. | |
| 7,648,186 | B2 | 1/2010 | Ukai et al. | |
| 9,180,792 | B2 | 11/2015 | Haller | |
| 9,227,529 | B2 | 1/2016 | Haller | |
| 9,579,995 | B2 | 2/2017 | Haller | |
| 9,623,769 | B1 | 4/2017 | Roeglin et al. | |
| 10,988,053 | B2 * | 4/2021 | Kish | B60N 2/0256 |
| 11,679,696 | B2 * | 6/2023 | Vetere, II | B60N 2/146 297/344.22 |
| 12,491,799 | B2 * | 12/2025 | Kim | B60N 2/02246 |
| 2010/0253123 | A1 * | 10/2010 | DeCraene | B60N 2/062 297/344.21 |
| 2013/0113258 | A1 * | 5/2013 | Slungare | B60N 2/1625 297/344.21 |
| 2020/0055426 | A1 * | 2/2020 | Linnberg | B60N 2/143 |
| 2020/0086768 | A1 * | 3/2020 | Line | B60N 2/143 |
| 2020/0086769 | A1 * | 3/2020 | Aktas | B60N 2/06 |
| 2020/0121082 | A1 * | 4/2020 | Brooks | A47C 1/06 |
| 2020/0223329 | A1 * | 7/2020 | Dry | B60N 2/062 |
| 2020/0353846 | A1 * | 11/2020 | Kish | B60N 2/0228 |
| 2020/0384896 | A1 * | 12/2020 | Touzet | B60N 2/14 |
| 2021/0170921 | A1 * | 6/2021 | Seibold | B60N 2/10 |
| 2021/0394648 | A1 * | 12/2021 | Vetere, II | B60N 2/146 |
| 2023/0286419 | A1 * | 9/2023 | Mclaughlin | B60N 2/02246 |
| 2024/0270125 | A1 * | 8/2024 | Kim | B60N 2/02246 |
| 2024/0278694 | A1 * | 8/2024 | Kang | B60N 2/146 |
| 2024/0308396 | A1 * | 9/2024 | Kim | B60N 2/14 |
| 2024/0343168 | A1 * | 10/2024 | Kim | B60N 2/02253 |
| 2024/0359598 | A1 * | 10/2024 | Kim | B60N 2/14 |
| 2025/0100425 | A1 * | 3/2025 | Song | B60N 2/02246 |
| 2025/0332975 | A1 * | 10/2025 | Kim | B60N 2/14 |
| 2025/0346159 | A1 * | 11/2025 | Vetere, II | B60N 2/14 |
| 2026/0055802 | A1 * | 2/2026 | Kim | B60N 2/14 |
| 2026/0084586 | A1 * | 3/2026 | Kim | B60N 2/02246 |
| 2026/0103121 | A1 * | 4/2026 | Kim | B60N 2/146 |
| 2026/0116270 | A1 * | 4/2026 | Üstünberk | B60N 2/02246 |
| 2026/0131703 | A1 * | 5/2026 | Kim | B60N 2/146 |

FOREIGN PATENT DOCUMENTS

| | | | |
|---|---|---|---|
| EP | 3925822 | A1 | 12/2021 |
| KR | 10-2004-0051941 | A | 6/2004 |
| KR | 2438307 | B1 | 9/2022 |

* cited by examiner

SWIVEL MECHANISM WITH DUAL FUNCTION BEARING PLATE

CROSS-REFERENCE TO RELATED APPLICATIONS

This application claims priority to U.S. Provisional Application 63/344,215, filed on May 20, 2022, the disclosure of which is hereby incorporated by reference in its entirety.

FIELD AND BACKGROUND OF THE INVENTION

The present invention relates to a seat assembly for use in an automotive vehicle. More particularly, the invention relates to a swivel mechanism for use on an automotive seat assembly configured to allow rotation of the seat assembly between forward-facing and rearward-facing positions.

DESCRIPTION OF RELATED ART

Automotive vehicles typically include one or more seat assemblies having a seat cushion and a seat back for supporting a passenger above a vehicle floor. It is commonly known for certain seat assemblies to be pivotable between a forward-facing position and a rearward-facing position. It is also commonly known for certain seat assemblies to include a swivel mechanism operatively coupled between the seat cushion and a seat base and configured to allow rotation of the seat cushion between the forward-facing and rearward-facing positions.

The swivel mechanisms typically include an upper plate fixedly coupled to the seat cushion, a lower plate fixedly coupled to the seat base, and a swivel plate positioned axially between the upper and lower plates. In addition, certain swivel mechanisms typically include rollers, bearings, and/or sliding elements positioned between the upper and lower plates and the swivel plate to allow for smooth adjustment and effort in rotating the swivel mechanism. In certain swivel mechanisms, bumpers and/or wedges are also included within the swivel mechanism to improve mechanical stability in the locked position. In addition, local reinforcements, such as J-Hooks, are often added to the upper plate and/or the lower plate to improve the load-carrying capability of the swivel mechanism.

However, commonly known swivel mechanisms incorporated into seat assemblies may have unacceptable looseness in the axial direction, partially due to gaps between the rollers, bearings, and/or sliding elements relative to the upper plate, lower plate, and the swivel plate. In addition, the J-Hooks typically have an undesirable material thickness and assembly cost required since the J-Hooks are circumferentially spaced apart around the swivel plate.

It is desirable, therefore, to reduce the looseness in the swivel mechanism in the axial direction without including wedges or bumpers into the swivel mechanism. In addition, it is desirable to reduce the material thickness of the J-Hooks and assembly cost of the swivel mechanism while providing sufficient peel strength in the axial direction.

SUMMARY OF THE INVENTION

According to one embodiment, there is provided a swivel mechanism for use in a seat assembly for an automotive vehicle. The swivel mechanism includes a base plate and a swivel plate. The swivel plate is pivotally coupled to the base plate and includes an inner flange extending in a circumferential direction around a central aperture extending through the swivel plate, and an outer ring extending in the circumferential direction and spaced radially outward from the inner flange, and an outer flange extending upward from the outer ring. The swivel mechanism also includes a retaining ring comprising a ring portion extending in the circumferential direction and a leg portion projecting downward from the ring portion through the central aperture in the swivel plate and fixedly coupled to the base plate with the inner flange spaced axially between the ring portion and the base plate. The swivel mechanism also includes a bearing plate comprising an upper channel extending in the circumferential direction and a J-shaped channel extending in the circumferential direction and spaced radially outward of the upper channel. The J-shaped channel further comprises an inner side projecting axially upward from the upper channel, an outer side projecting axially downward and spaced radially outward from the inner side, and a radial portion extending radially between the inner side and the outer side with the outer side fixedly coupled to the base plate.

According to another embodiment, there is provided a seat assembly for an automotive vehicle. The seat assembly includes a seat cushion, a seat base, and a swivel mechanism pivotally coupling the seat cushion to the seat base. The swivel mechanism includes a base plate fixedly coupled to the seat base and a swivel plate pivotally coupled to the base plate and fixedly coupled to the seat cushion. The swivel plate further includes an inner flange extending in a circumferential direction around a central aperture extending through the swivel plate, an outer ring extending in the circumferential direction and spaced radially outward from the inner flange, and an outer flange extending upward from the outer ring. The swivel mechanism also includes a retaining ring comprising a ring portion extending in the circumferential direction and a leg portion projecting downward from the ring portion through the central aperture in the swivel plate and fixedly coupled to the base plate with the inner flange spaced axially between the ring portion and the base plate. The swivel mechanism also includes a bearing plate comprising an upper channel extending in the circumferential direction and a J-shaped channel extending in the circumferential direction and spaced radially outward of the upper channel. In addition, the J-shaped channel comprises an inner side projecting axially upward from the upper channel, an outer side projecting axially downward and spaced radially outward from the inner side, and a radial portion extending radially between the inner side and the outer side with the outer side fixedly coupled to the base plate. The outer ring is spaced axially between the upper channel and the base plate, and the outer flange is spaced radially between the inner side and the outer side and spaced axially between the radial portion and the base plate.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

FIGS. 1-4 illustrate components of a seat assembly 10 for use in an automotive vehicle according to embodiments described herein. Directional references employed or shown in the description, figures, or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
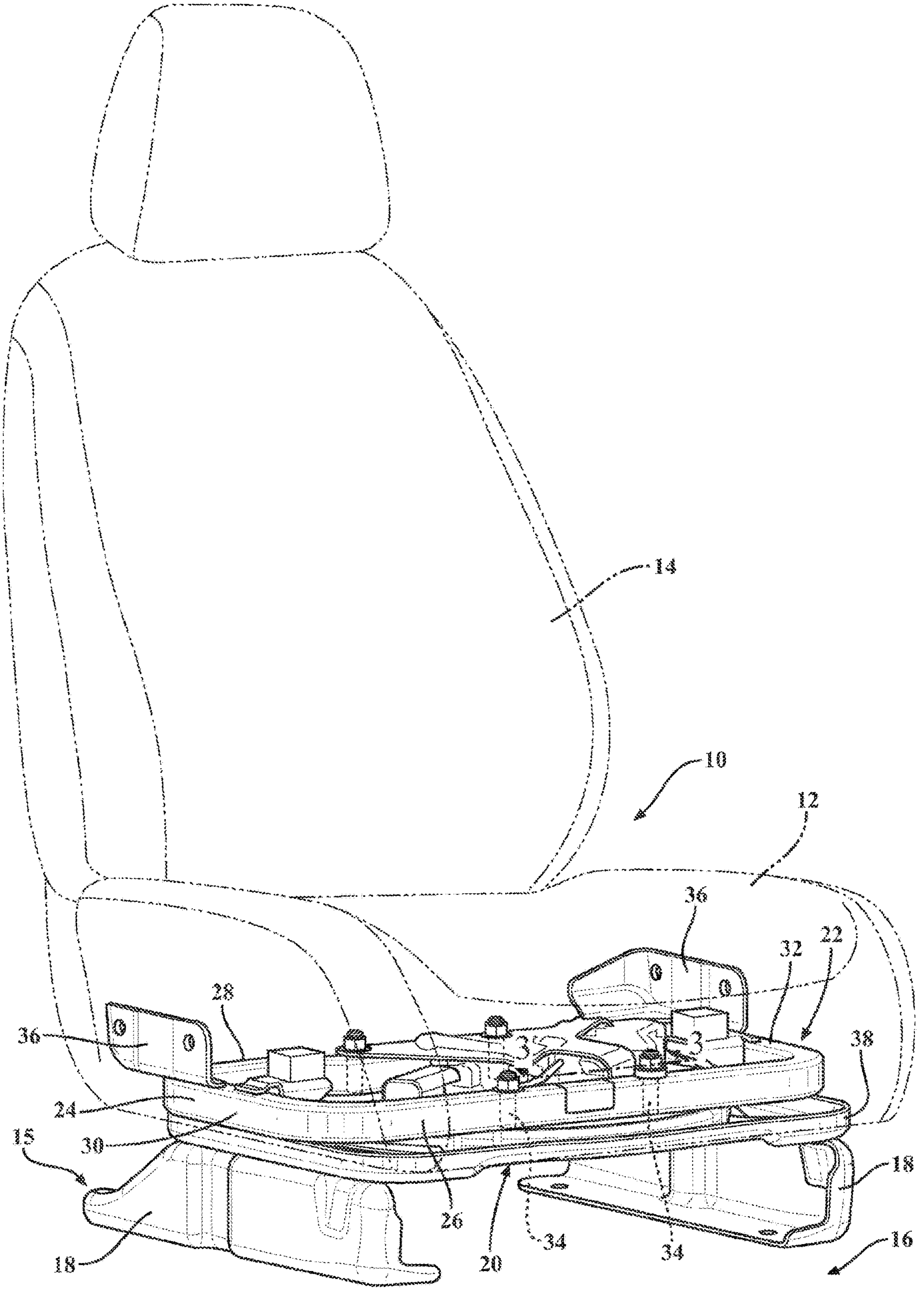
FIG. 1 is a perspective view of a seat assembly including a swivel mechanism pivotally coupled to a seat cushion and a seat base, according to one embodiment of the present invention.

Depicted in FIG. 1, the seat assembly 10 includes a seat cushion 12, a seat back 14 pivotally coupled to the seat cushion 12, and a seat base 15 configured to support the seat assembly 10 above a vehicle floor 16. The seat base 15 may include a pair of laterally spaced apart riser brackets 18 directly fixedly coupled to the vehicle floor 16 or fixedly coupled to other components of the seat base 15, such as a sliding mechanism, a height adjustment mechanism, a tilt mechanism, and the like, without altering the scope of the present invention. In addition, the seat assembly 10 includes a swivel mechanism 20 pivotally coupling the seat cushion 12 to the seat base 15. The swivel mechanism 20 allows the seat cushion 12 to be selectively pivoted relative to the seat base 15 between a forward-facing position and a rearward-facing position.

Referring to FIG. 1, the swivel mechanism 20 includes an upper structure 22 comprising a tubular frame 24 configured to support the seat cushion 12. The tubular frame 24 includes opposing front and rear portions 26, 28 extending between opposing inboard and outboard side portions 30, 32. A pair of laterally spaced apart bolt passageways 34 extend vertically through the front and rear portions 26, 28 of the tubular frame 24. It will be appreciated that the tubular frame 24 may be replaced by a plate, a bracket, and the like without altering the scope of the present invention. The swivel mechanism 20 also includes a pair of laterally spaced apart seat brackets 36 fixedly coupled to respective inboard and outboard side portions 30, 32 of the tubular frame 24 and fixedly coupled to the seat cushion 12.

Figure 2:
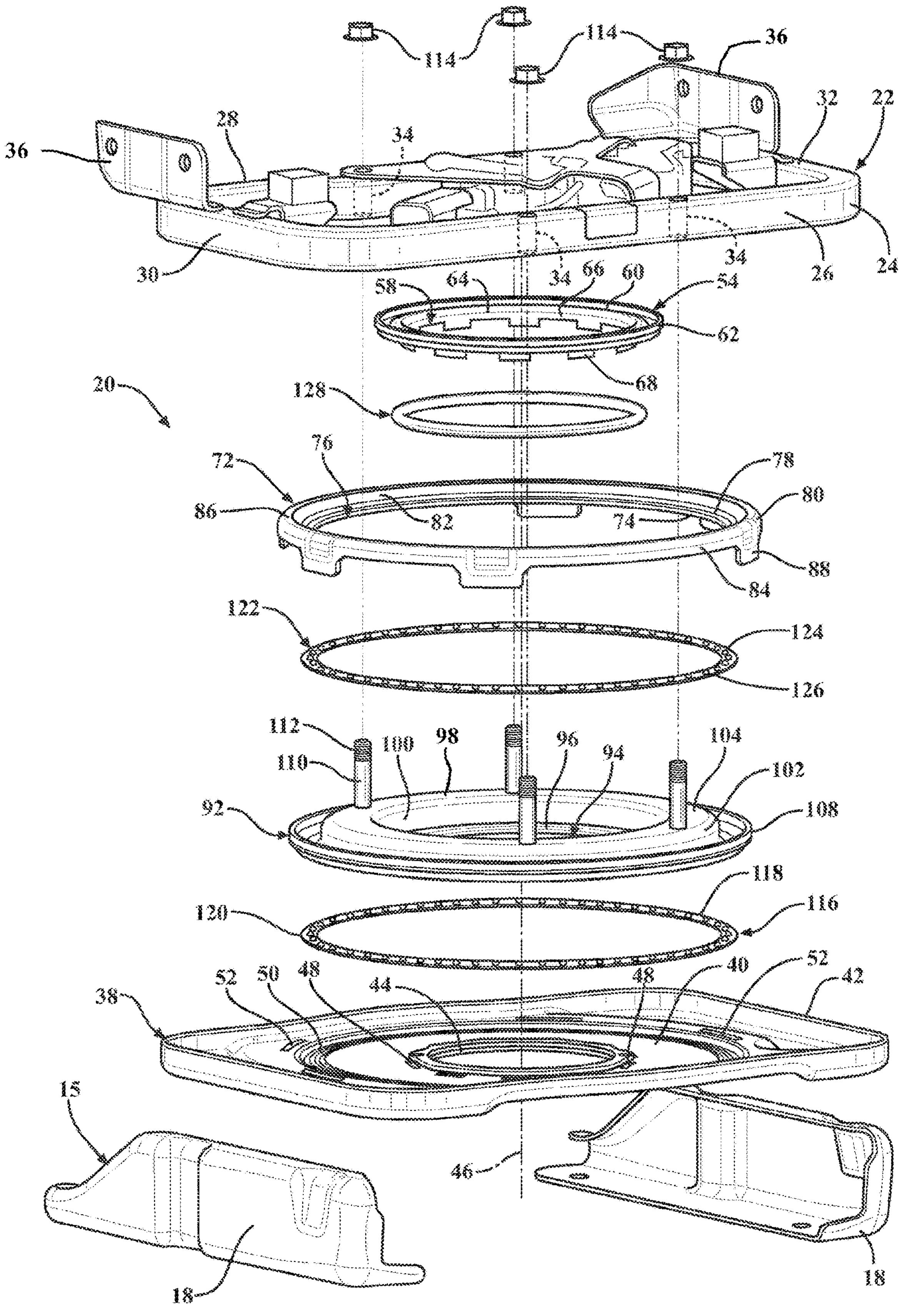
FIG. 2 is exploded perspective view of the swivel mechanism of FIG. 1.
Figure 3:
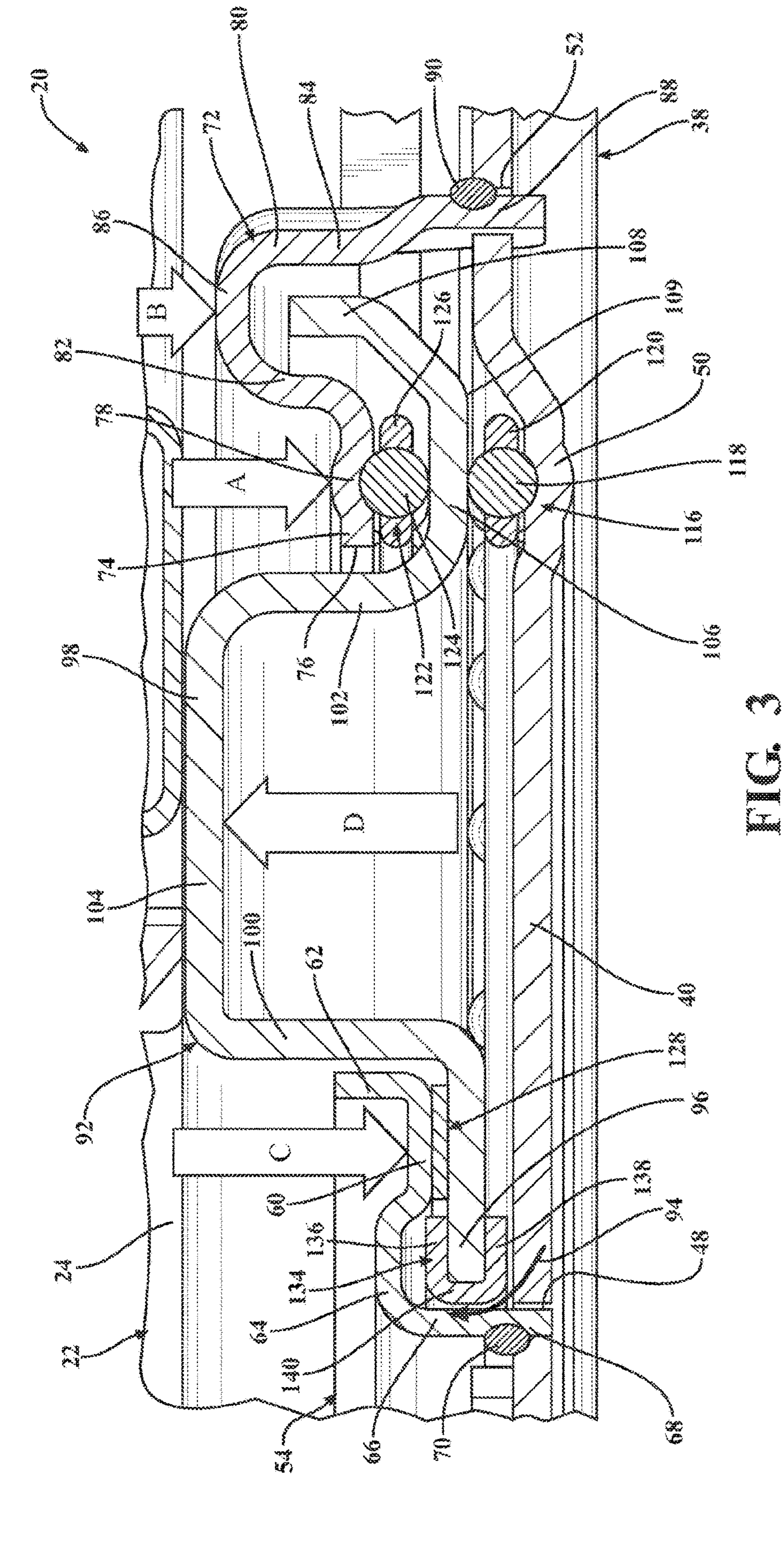
FIG. 3 is a cross-sectional view taken along line 3-3 of the swivel mechanism of FIG. 1, according to one embodiment of the present invention.

In addition, the swivel mechanism 20 includes a base plate 38 fixedly coupled to the seat base 15. In the embodiment shown in FIG. 1, the base plate 38 is fixedly coupled to upper portions of the riser brackets 18. Referring to FIGS. 2 and 3, the base plate 38 includes a support plate 40 extending in a generally horizontal direction and a ledge 42 projecting at generally a right angle from an outer edge of the support plate 40. In addition, the base plate 38 includes a central hole 44 extending through the support plate 40 defining an axis of rotation 46 of the swivel mechanism 20. The base plate 38 also includes a plurality of spaced apart inner slots 48 extending axially therethrough and spaced circumferentially around and radially outward from the central hole 44. The base plate 38 also includes an upward facing base channel 50 extending in a circumferential direction around the axis of rotation 46 and spaced radially outward from the inner slots 48. The base channel 50 is configured to support and contain a rolling element, a sliding element, or the like, as further described below. Further, the base plate 38 includes a plurality of spaced apart outer slots 52 extending axially therethrough and spaced circumferentially around and radially outward of the base channel 50. As shown in FIG. 2, the inner and outer slots 48, 52 are generally arcuate-shaped. It will be appreciated that the size, shape, number, and relative position of the inner and outer slots 48, 52 may vary without altering the scope of the present invention.

Depicted in FIGS. 2 and 3, the swivel mechanism 20 also includes a retaining ring 54 fixedly coupled to the base plate 38. The retaining ring 54 is generally ring-shaped with a central passageway 58 extending axially therethrough and defining a center axis of the retaining ring 54. The central passageway 58 has a longitudinal axis configured to generally align with the axis of rotation 46 of the swivel mechanism 20 when the retaining ring 54 is assembled with the base plate 38. The retaining ring 54 includes a ring portion 60 extending in a circumferential direction around the central passageway 58 and extending radially outward. The retaining ring 54 also includes an outer rim 62 extending upward from an outer edge of the ring portion 60. In addition, the retaining ring 54 includes a downward facing J-shaped channel 64 extending from an inner edge of the ring portion 60 with a leg portion 66 extending circumferentially around the central passageway 58. The retaining ring 54 further includes a plurality of circumferentially spaced apart inner tabs 68 extending in a downward axial direction from the leg portion 66 and configured to matingly engage with respective inner slots 48 in the base plate 38. During assembly, the inner tabs 68 are inserted into the respective inner slots 48 followed by one or more of the inner tabs 68 fixedly coupled to the base plate 38 by a weld 70. It will be appreciated that one or more of the inner tabs 68 may be fixedly coupled to the base plate 38 by a weld 70, a friction fit, a staking process, a mechanical fastener, or the like without altering the scope of the present invention.

The swivel mechanism 20 also includes a bearing plate 72 fixedly coupled to the base plate 38 and spaced radially apart from the retaining ring 54. The bearing plate 72 includes an inner ring 74 extending circumferentially around a center opening 76 in the bearing plate 72. The center opening 76 has a longitudinal axis configured to generally align with the axis of rotation 46 of the swivel mechanism 20 when the bearing plate 72 is assembled with the base plate 38. The inner diameter of the center opening 76 in the bearing plate 72 is preferably greater than the outer diameter of the outer rim 62 of the retaining ring 54. The bearing plate 72 includes a downward-facing upper channel 78 having an arcuate shape and extending generally radially outward from the inner ring 74. Further, the bearing plate 72 includes a downward-facing J-shaped channel 80 extending in a circumferential direction and having spaced apart inner and outer sides 82, 84 extending axially downward from a radial portion 86 with the inner side 82 of the J-shaped channel 80 extending upward from an outer edge of the upper channel 78. The bearing plate 72 also includes a plurality of circumferentially spaced apart outer tabs 88 extending in a downward axial direction from the outer side 84 of the J-shaped channel 80 and configured to matingly engage with respective outer slots 52 in the base plate 38. During assembly, the outer tabs 88 are inserted into the respective outer slots 52 and one or more of the outer tabs 88 are fixedly coupled to the base plate 38 by a weld 90. It will be appreciated that one or more of the outer tabs 88 may be fixedly coupled to the base plate 38 by a weld 90, a friction fit, a staking process, a mechanical fastener, or the like without altering the scope of the present invention.

Referring to FIGS. 2 and 3, the swivel mechanism 20 also includes a swivel plate 92 spaced axially between the retaining ring 54, the bearing plate 72, and the base plate 38. The swivel plate 92 is generally ring-shaped with a central aperture 94 extending axially therethrough and bounded by an inner flange 96 extending circumferentially around the central aperture 94. The central aperture 94 has a longitudinal axis configured to generally align with the axis of rotation 46 of the swivel mechanism 20 when the swivel plate 92 is assembled with the base plate 38. The swivel plate 92 also includes a downward-facing U-shaped channel 98 comprising spaced apart inner and outer walls 100, 102 extending downward from a radial wall 104 with the inner wall 100 extending upward from an outer edge of the inner flange 96. The inner wall 100 is configured such that the inner wall 100 is spaced radially outward from the outer rim 62 of the retaining ring 54 when the retaining ring 54 and the swivel plate 92 are assembled with the base plate 38. In addition, the outer wall 102 is configured such that the outer wall 102 is spaced radially inward from the inner ring 74 of the bearing plate 72 when the swivel plate 92 and the bearing plate 72 are assembled with the base plate 38. The swivel plate 92 also includes an outer ring 106 extending radially outward from a lower end of the outer wall 102 and an outer flange 108 projecting axially upward from the outer ring 106. The outer wall 102, the outer ring 106, and the outer flange 108 form an upward-facing C-shaped channel 109. The outer ring 106 is configured to be spaced axially between the base channel 50 in the base plate 38 and the upper channel 78 in the bearing plate 72 when assembled as part of the swivel mechanism 20. In addition, the outer flange 108 is configured to extend into the J-shaped channel 80 in the bearing plate 72 with the outer flange 108 being spaced radially between the inner and outer sides 82, 84 and spaced axially apart from the radial portion 86.

Shown in FIG. 2, the swivel mechanism 20 includes a plurality of spaced apart shoulder bolts 110 corresponding to the number of bolt passageways 34 in the tubular frame 24. The shoulder bolts 110 include a lower end fixedly coupled to the swivel plate 92 and an upper threaded end 112 extending axially upward from the swivel plate 92. During assembly, the shoulder bolts 110 are inserted through the respective bolt passageways 34 in the tubular frame 24. Next, threaded nuts 114 are fixedly coupled to the threaded ends 112 of the shoulder bolts 110, fixedly coupling the swivel plate 92 to the tubular frame 24. It will be appreciated that the shoulder bolts 110 may include a shaft extending from a bolt head (not shown) and terminating at the upper threaded end 112 with the shaft inserted through holes in the swivel plate 92 and the bolt head abutting a lower side of the swivel plate 92 without altering the scope of the present invention.

Referring to FIGS. 2 and 3, the swivel mechanism 20 also includes a lower rolling element 116 assembled axially between the swivel plate 92 and the base plate 38 and configured to allow rotation of the swivel plate 92 relative to the base plate 38. The lower rolling element 116 is generally ring-shaped with a passageway extending axially therethrough. The lower rolling element 116 also comprises a plurality of spaced apart rollers 118 supported within a cage 120. During assembly, the lower rolling element 116 is inserted into the base channel 50 in the base plate 38 prior to assembly of the swivel plate 92 with the base plate 38. The base channel 50 in the base plate 38 and the lower surface of the outer ring 106 of the swivel plate 92 are configured as a lower race and an upper race, respectively, for the lower roller element 116. It will be appreciated that the lower rolling element 116 may be replaced by a lower sliding element (not shown), a ball bearing, a cylindrical bearing, a needle bearing, and the like, without altering the scope of the present invention.

In addition, the swivel mechanism 20 also includes an upper rolling element 122 assembled axially between the bearing plate 72 and the swivel plate 92 and configured to allow rotation of the swivel plate 92 relative to the bearing plate 72. The upper rolling element 122 is generally ring-shaped with a passageway extending axially therethrough. The upper rolling element 122 also comprises a plurality of spaced apart rollers 124 supported within a cage 126. During assembly, the upper rolling element 122 is inserted into the C-shaped channel 109 abutting an upper surface of the outer ring 106 in the swivel plate 92 prior to assembly of the bearing plate 72 with the base plate 38. After assembly, the upper rolling element 122 is spaced axially between the upper channel 78 in the bearing plate 72 and the outer ring 106 in the swivel plate 92. The upper surface of the outer ring 106 and the lower surface of the upper channel 78 are configured as a lower race and an upper race, respectively, for the upper roller element 122. It will be appreciated that the upper rolling element 122 may be replaced by an upper sliding element (not shown), a ball bearing, a cylindrical bearing, a needle bearing, and the like, without altering the scope of the present invention.

Depicted in FIGS. 2 and 3, the swivel mechanism 20 also includes a sliding element 128 assembled axially between the retaining ring 54 and the swivel plate 92 and configured to allow rotation of the swivel plate 92 relative to the retaining ring 54. The sliding element 128 is alternatively described as a central sliding element 128. In more detail, the sliding element 128 is generally disc-shaped with a passageway extending axially therethrough and formed out of a low friction material. Referring to FIG. 3, the sliding element 128 is configured to face the lower surface of the ring portion 60 of the retaining ring 54 and face an upper surface of the inner flange 96 of the swivel plate 92.

Shown in FIG. 3, the swivel mechanism 20 also includes a flange sliding element 134 assembled with the inner flange 96 of the swivel plate 92 and configured to allow rotation of the swivel plate 92 relative to the retaining ring 54 and the base plate 38. The flange sliding element 134 is generally ring-shaped with a passageway extending axially therethrough and formed out of a lower fiction material. In addition, the flange sliding element 134 includes spaced apart upper and lower flanges 136, 138 extending radially outward from a distal wall 140 such that the flange sliding element 134 has a generally U-shaped cross-section. During assembly, the inner flange 96 of the swivel plate 92 is inserted between the upper and lower flanges 136, 138 of the flange sliding element 134.

Referring to FIG. 3, the swivel mechanism 20 includes a "net build" assembly function which reduces looseness in the Z-direction (i.e., the axial direction 46). To assemble the swivel mechanism 20, the lower rolling element 116 is inserted into the base channel 50 in the base plate 38. Next, the flange sliding element 134 is assembled with the inner flange 96 of the swivel plate 92. The swivel plate 92 is placed on the base plate 38 with the lower roller element 116 spaced between the base channel 50 in the base plate 38 and the lower surface of the outer ring 106. Next, the upper rolling element 122 is placed within the C-shaped channel 109 resting on the upper surface of the outer ring 106. In addition, the sliding element 128 is placed on the upper surface of the inner flange 96. After the upper rolling element 122 and the sliding element 128 are assembled with the swivel plate 92, the inner tabs 68 of the retaining ring 54 are inserted into the respective inner slots 48 in the base plate 38. Further, the outer tabs 88 of the bearing plate 72 are inserted into the respective outer slots 52 in the base plate 38. Loads are applied to the upper surface of the bearing plate 72 against the upper channel 78 and the radial portion 86, as illustrated by arrows A and B, and applied to the upper surface of the ring portion 60 of the retaining ring 54, as illustrated by arrow C prior to welding the bearing plate 72 and the retaining ring 54 to the base plate 38. In addition, the loads are applied (arrows A, B, and C) against the retaining ring 54 and the bearing plate 72 while the welds 70, 90 are formed to fixedly couple the retaining ring 54 and the bearing plate 72 to the base plate 38. The loads applied (arrows A, B, C) to the top of the bearing plate 72 and the retaining ring 54 during the welding process eliminate gaps in the rolling and sliding areas. The design of the retaining ring 54 and the bearing plate 72 allows for Z-direction net build and the elimination of looseness since the retaining ring 54 and the bearing plate 72 are configured so that loads (arrows A, B, C) may be applied during the welding process.

Also shown in FIG. 3, the bearing plate 72 has a dual function. A first function of the bearing plate 72 is to support and contain the upper rolling element 122, the outer ring 106 of the swivel plate 92, and the lower rolling element 116 axially between the upper channel 78 of the bearing plate 72 and the base channel 50 in the base plate 38. In addition, a second function of the bearing plate 72 is to provide peel strength against load (arrow D) through the swivel plate 92. More specifically, the bearing plate 72 includes the J-shaped channel 80 which serves as a continuous "J-Hook" to provide peel strength against load (arrow D) through the swivel plate 92. The material thickness of the J-shaped channel 80 may be reduced in comparison to the material thickness of conventional "4 corner" J-Hooks included in certain known swivel mechanisms since the J-shaped channel 80 provides 360° coverage around the swivel plate 92.

Figure 5:
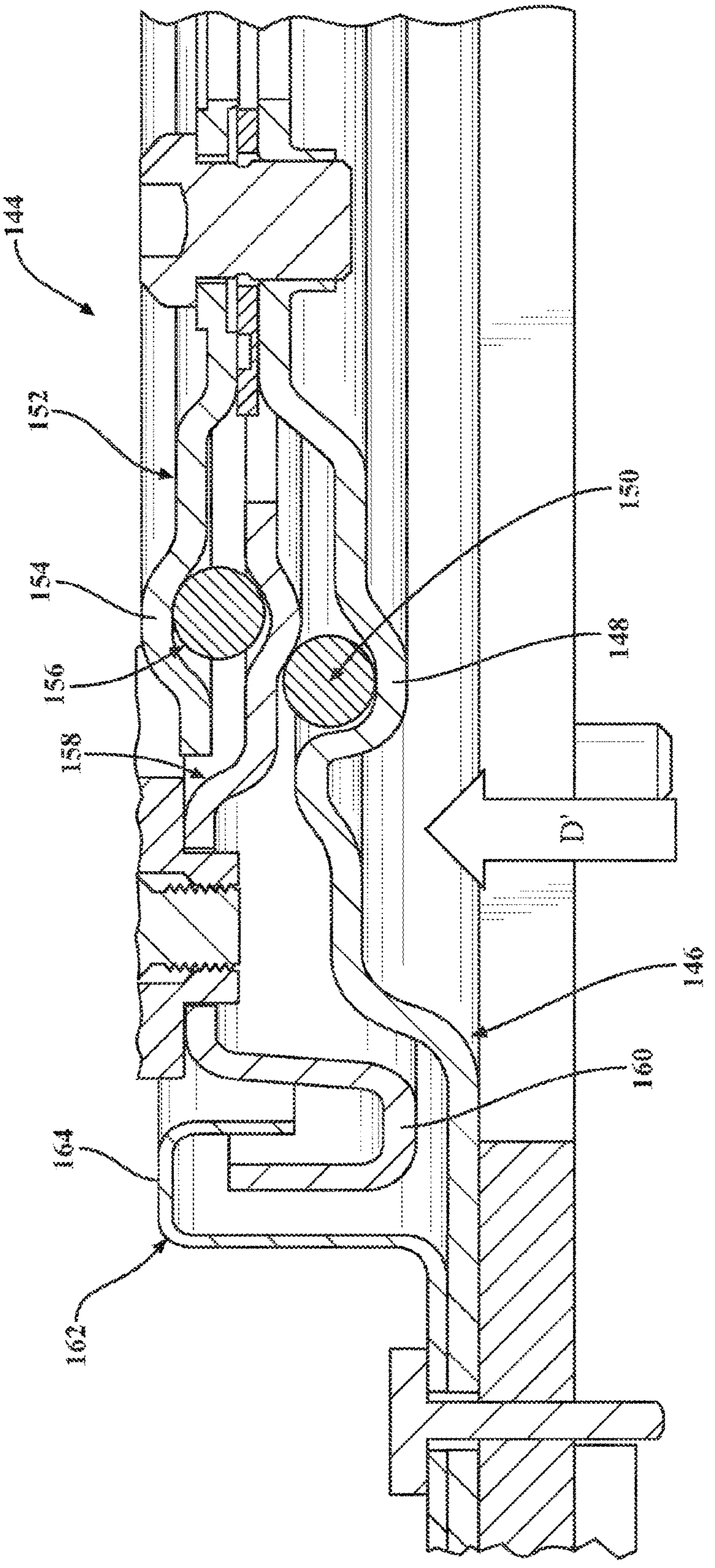
FIG. 5 PRIOR ART
FIG. 5 is a cross-sectional view of a portion of a known swivel mechanism for a seat assembly.

In comparison, an exemplary known swivel mechanism 144 is shown in FIG. 5 wherein the first function of supporting the rolling elements and the second function of providing peel strength against load (arrow D) are performed by separate components instead of the dual function bearing plate 72 of the present invention. The known swivel mechanism 144 comprises a base plate 146 having a lower channel 148, a lower rolling element 150 positioned within the lower channel 148, an upper plate 152 fixedly coupled to the base plate 146 and having an upper channel 154, and an upper rolling element 156 positioned within the upper channel 154. The known swivel mechanism 144 also includes a swivel plate 158 spaced axially between the base plate 146 and the upper plate 152 and extending between the lower and upper rolling elements 150, 156 such that the swivel plate 158 is pivotably coupled to the base plate 146 and the upper plate 152. Thus, the first function of supporting and containing the lower and upper rolling elements 150, 156 is performed by the upper plate 152 in the known swivel mechanism 144.

The known swivel plate 158 also includes an upward facing U-shaped channel 160 extending circumferentially around an outer perimeter of the swivel plate 158. Alternatively, the U-shaped channel 160 may be replaced by J-Hooks (not shown) fixedly coupled to the swivel plate 158, as is commonly known in the art. The known swivel mechanism 144 also includes J-Hooks 162 riveted to the base plate 146 at four places spaced around an outer perimeter of the swivel plate 158, commonly described as "4 corner" J-Hooks 162. The J-hook 162 includes an inverted J-shaped hook portion 164 configured to interlock with the upward facing U-shaped channel 160 of the swivel plate 158. The J-Hooks 162 provide local reinforcement for the known swivel mechanism 144 to improve the load-carrying capability of the known swivel mechanism 144. Thus, the second function of providing peel strength against load (arrow D') is performed by the J-Hooks 162 in the known swivel mechanism 144.

Figure 4:
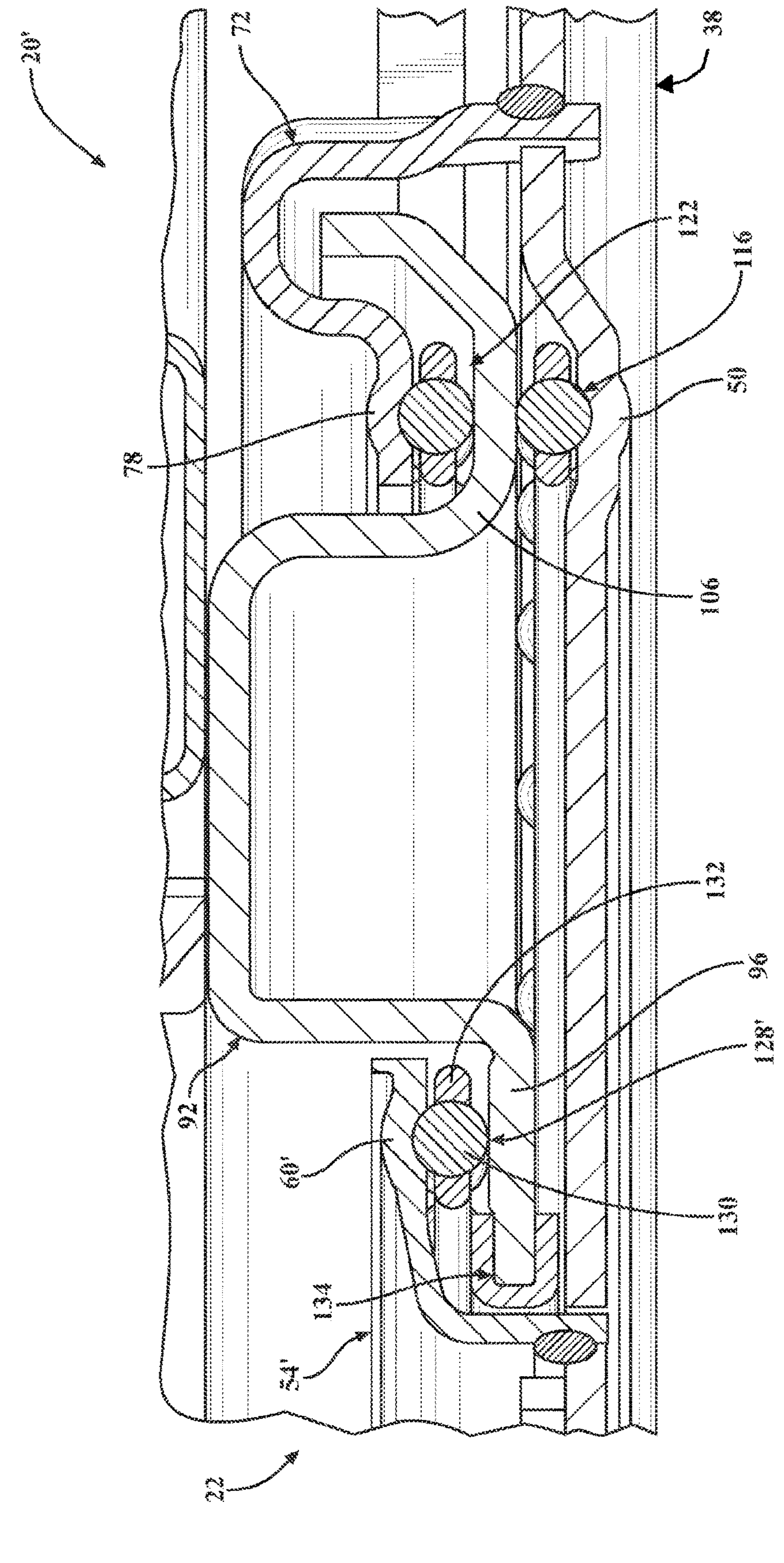
FIG. 4 is a cross-sectional view taken along line 3-3 of the swivel mechanism of FIG. 1, according to another embodiment of the present invention.

A second embodiment of the swivel mechanism 20' is shown in FIG. 4, where like primed reference numerals represent similar elements as those described above. The second embodiment shown in FIG. 4 depicts a central rolling element 128' in place of the sliding element 128 shown in FIG. 3. Only significant differences between the two embodiments are reflected in the Figures and the description below. The central rolling element 128' includes a plurality of spaced apart rollers 130 supported within a cage 132. In addition, the second embodiment includes a retaining ring 54' having a modified ring portion 60' having a lower surface configured as an upper race for the central rolling element 128'. It will be appreciated that the central rolling element 128' may be replaced by the central sliding element 128, a ball bearing, a cylindrical bearing, a needle bearing, and the like, without altering the scope of the present invention.

As discussed above, the seat assembly 10 of the present invention includes a swivel mechanism 20, 20' comprising a dual function bearing plate 72 and a retaining ring 54 fixedly coupled to a base plate 38. Further, the swivel mechanism 20, 20' includes rolling and/or sliding elements 116, 122, 128, 128' pivotally coupling a swivel plate 92 to the bearing plate 72, the retaining ring 54, and the base plate 38. The bearing plate 72 performs a first function of supporting and containing the rolling elements 116, 122 against the base plate 38. In addition, the bearing plate 72 performs a second function of providing peel strength against load (arrow D) through the swivel plate 92. The retaining ring 54 and the bearing plate 72 are configured to reduce assembly costs of the swivel mechanism 20, 20' and reduce looseness with the rolling and/or sliding elements 116, 122, 128, 128' in the axial direction. In addition, the material thickness of the bearing plate 72 may be reduced in comparison to the typical material thickness of the known J-Hooks while providing sufficient peel strength in the axial direction since the bearing plate 72 circumferentially surrounds the swivel plate 92.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A swivel mechanism for use in a seat assembly for an automotive vehicle, the swivel mechanism comprising:

a base plate;

a swivel plate pivotally coupled to the base plate and including an inner flange extending in a circumferential direction around a central aperture extending through the swivel plate, an outer ring extending in the circumferential direction and spaced radially outward from the inner flange, and an outer flange extending upward from the outer ring;

a retaining ring including a ring portion extending in the circumferential direction and a leg portion projecting downward from the ring portion through the central aperture in the swivel plate and fixedly coupled to the base plate with the inner flange spaced axially between the ring portion and the base plate; and a bearing plate including an upper channel extending in the circumferential direction and a J-shaped channel extending in the circumferential direction and spaced radially outward of the upper channel, the J-shaped channel comprising an inner side projecting axially upward from the upper channel, an outer side projecting axially downward and spaced radially outward from the inner side, and a radial portion extending radially between the inner side and the outer side with the outer side fixedly coupled to the base plate.

2. The swivel mechanism as set forth in claim 1, wherein: the outer ring is spaced axially between the upper channel and the base plate, and the outer flange is spaced radially between the inner side and the outer side and spaced axially between the radial portion and the base plate.

3. The swivel mechanism as set forth in claim 2, further comprising:

an upper rolling element or an upper sliding element pivotally coupling the upper channel of the bearing plate and the outer ring of the swivel plate.

4. The swivel mechanism as set forth in claim 3, further comprising:

a lower rolling element or a lower sliding element pivotally coupling the outer ring of the swivel plate and the base plate.

5. The swivel mechanism as set forth in claim 4, further comprising:

a central rolling element or a central sliding element pivotally coupling the ring portion of the retaining ring and the base plate.

6. The swivel mechanism as set forth in claim 5, further comprising:

a flange sliding element fixedly coupled to the inner flange of the swivel plate.

7. The swivel mechanism as set forth in claim 2, further comprising:

an upper rolling element pivotally coupling the upper channel of the bearing plate and the outer ring of the swivel plate;

a lower rolling element pivotally coupling the outer ring of the swivel plate and the base plate; and a central rolling element pivotally coupling the ring portion of the retaining ring and the base plate;

wherein the swivel plate is pivotally coupled to the bearing plate, the base plate, and the retaining ring by the upper rolling element, the lower rolling element, and the central rolling element, respectively.

8. The swivel mechanism as set forth in claim 2, wherein:

the upper channel extends circumferentially around a center opening extending axially through the bearing plate; and the J-shaped channel extends circumferentially around the bearing plate.

9. The swivel mechanism as set forth in claim 8, wherein: the center opening has a diameter greater than an outer diameter of the retaining ring.

10. The swivel mechanism as set forth in claim 2, further comprising:

a tubular frame fixedly coupled to the swivel plate.

11. A seat assembly for an automotive vehicle, the seat assembly comprising:

a seat cushion;

a seat base; and a swivel mechanism pivotally coupling the seat cushion to the seat base, the swivel mechanism comprising:

a base plate fixedly coupled to the seat base;

a swivel plate pivotally coupled to the base plate and fixedly coupled to the seat cushion, the swivel plate including an inner flange extending in a circumferential direction around a central aperture extending through the swivel plate, an outer ring extending in the circumferential direction and spaced radially outward from the inner flange, and an outer flange extending upward from the outer ring;

a retaining ring including a ring portion extending in the circumferential direction and a leg portion projecting downward from the ring portion through the central aperture in the swivel plate and fixedly coupled to the base plate with the inner flange spaced axially between the ring portion and the base plate; and a bearing plate including an upper channel extending in the circumferential direction and a J-shaped channel extending in the circumferential direction and spaced radially outward of the upper channel, the J-shaped channel comprising an inner side projecting axially upward from the upper channel, an outer side projecting axially downward and spaced radially outward from the inner side, and a radial portion extending radially between the inner side and the outer side with the outer side fixedly coupled to the base plate;

wherein the outer ring is spaced axially between the upper channel and the base plate, and the outer flange is spaced radially between the inner side and the outer side and spaced axially between the radial portion and the base plate.

12. The seat assembly as set forth in claim 11, further comprising:

an upper rolling element or an upper sliding element pivotally coupling the upper channel of the bearing plate and the outer ring of the swivel plate;

a lower rolling element or a lower sliding element pivotally coupling the outer ring of the swivel plate and the base plate; and a central rolling element or a central sliding element pivotally coupling the ring portion of the retaining ring and the base plate.

13. The seat assembly as set forth in claim 12, further comprising:

a flange sliding element fixedly coupled to the inner flange of the swivel plate.

14. The seat assembly as set forth in claim 13, wherein:

the upper channel extends circumferentially around a center opening extending axially through the bearing plate; and the J-shaped channel extends circumferentially around the bearing plate.

15. The seat assembly as set forth in claim 14, further comprising:

a tubular frame fixedly coupled to the swivel plate and fixedly coupled to the seat cushion.

16. The seat assembly as set forth in claim 15, further comprising:

a plurality of shoulder bolts fixedly coupling the swivel plate to the tubular frame.

17. The seat assembly as set forth in claim 16, wherein:

the base plate includes a plurality of spaced apart inner slots; and the retaining ring includes a plurality of spaced apart inner tabs inserted into respective inner slots in the base plate.

18. The seat assembly as set forth in claim 17, wherein:

the base plate includes a plurality of spaced apart outer slots; and the bearing plate includes a plurality of spaced apart outer tabs inserted into respective outer slots in the base plate.

19. The seat assembly as set forth in claim 11, wherein:

the seat base comprises a pair of laterally spaced apart riser brackets.

* * * * *